US006816735B1

(12) United States Patent
Rayburn et al.

(10) Patent No.: US 6,816,735 B1
(45) Date of Patent: Nov. 9, 2004

(54) METHOD AND SYSTEM FOR FACILITATING LOCATION-BASED SERVICES

(75) Inventors: Terry Rayburn, Kansas City, MO (US); James Hallock, Overland Park, KS (US); Von K. McConnell, Leawood, KS (US); Baoquan Zhang, Overland Park, KS (US); Donald F. Douglas, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 505 days.

(21) Appl. No.: 09/821,334

(22) Filed: Mar. 29, 2001

(51) Int. Cl.[7] ............................ H04Q 7/20; H01Q 3/00; H01Q 21/06; H01Q 21/24; H04M 7/00

(52) U.S. Cl. .................... 455/456.4; 455/457; 342/363; 379/221.13; 705/38; 707/10

(58) Field of Search .......................... 379/220; 455/457, 455/456.4; 342/363; 705/38; 707/10

(56) References Cited

U.S. PATENT DOCUMENTS

| | | | | |
|---|---|---|---|---|
| 5,696,816 A | * | 12/1997 | Sonnenberg | 379/221.13 |
| 5,913,170 A | * | 6/1999 | Wortham | 455/457 |
| 5,926,133 A | * | 7/1999 | Green, Jr. | 342/363 |
| 6,002,932 A | | 12/1999 | Kingdon et al. | |
| 6,002,936 A | | 12/1999 | Roel-Ng et al. | |
| 6,088,594 A | | 7/2000 | Kingdon et al. | |
| 6,115,754 A | | 9/2000 | Landgren | |
| 2003/0078880 A1 | * | 4/2003 | Alley et al. | 705/38 |
| 2003/0220925 A1 | * | 11/2003 | Lior | 707/10 |

OTHER PUBLICATIONS

TR 45, "Position Determination Service Standard for Dual–Mode Spread Spectrum Systems," TIA/EIA/IS–801, Oct. 15, 1999.

TR 45, "Enhanced Wireless 9–1–1 Phase 2," J–STD–036, Jul. 12, 2000.

* cited by examiner

*Primary Examiner*—William Cumming

(57) ABSTRACT

A method and system are disclosed for facilitating location-based services. In the arrangement described, when a mobile station is engaged in a data session with a server, the mobile station may be made to initiate a voice call to a designated number. As a result, a switch or other such entity may send a signaling message (such as an Origination Request message) to a central controller, thereby providing the central controller with an indication of the mobile station's current location. The central controller may then make that location information available to the server. In turn, the server may use the location to perform a location based service, such as providing location-based information to the mobile station.

10 Claims, 5 Drawing Sheets

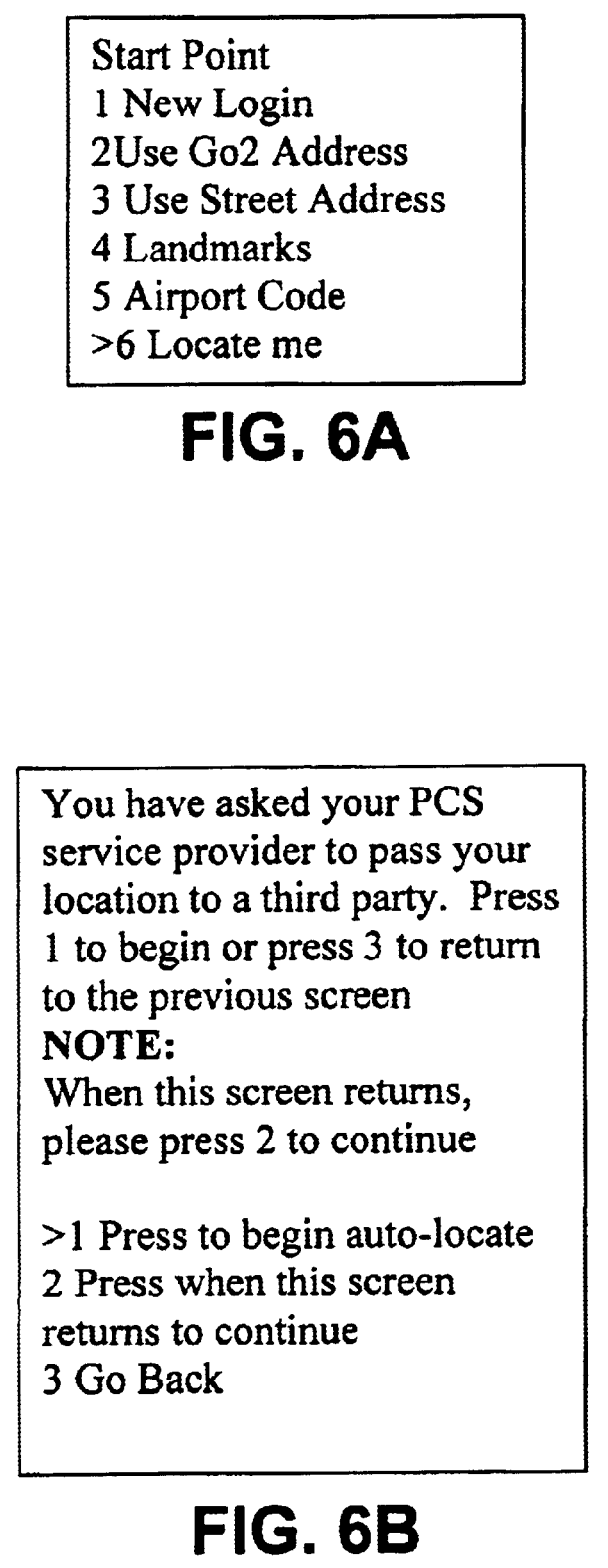

Start Point
1 New Login
2Use Go2 Address
3 Use Street Address
4 Landmarks
5 Airport Code
>6 Locate me

FIG. 6A

You have asked your PCS service provider to pass your location to a third party. Press 1 to begin or press 3 to return to the previous screen

NOTE:

When this screen returns, please press 2 to continue

>1 Press to begin auto-locate
2 Press when this screen returns to continue
3 Go Back

FIG. 6B

METHOD AND SYSTEM FOR FACILITATING LOCATION-BASED SERVICES

BACKGROUND

1. Field of the Invention

The present invention relates to communications systems and, more particularly, to methods and systems for determining the location of mobile stations, such as cellular telephones, personal data assistants (PDAs), or notebook computers for instance.

2. Description of Related Art

Mobile stations that enable voice and data communications over an air interface are now commonplace. In a typical arrangement, a mobile station communicates via an air interface with a radio access system, which provides connectivity with a larger communications network such as the public switched telephone network (PSTN), an intranet or the Internet for instance. The radio access system may typically include a base transceiver station (BTS) (having an antenna that provides a radiation pattern defining the air interface), which is coupled or integrated with a base station controller (BSC). The BSC may then be coupled or integrated with a switch (e.g., a mobile switching center (MSC)) or gateway (e.g., a wireless access gateway) that connects with the communications network. With this arrangement, a user of the mobile station may thereby engage in a communication via the air interface and radio access system with an entity on the communications network.

To initiate a conventional voice call, for instance, a user may direct the mobile station to send dialed digits over the air interface. An MSC may then receive the dialed digits, determine where to route the call, and, through industry standard signaling mechanisms, seek to set up a voice call path or session via the communications network with a destination corresponding to the dialed digits. Once the destination answers, the MSC may then connect the call with the mobile station, and voice communication may commence.

Similarly, to engage in an exemplary data communication session, a user of the mobile station may direct the mobile station to send data via the air interface and radio access system to a data server (e.g., web server) on the Internet or other data network, and the data server may send data via the radio access system and air interface to the mobile station.

To facilitate such data communications, many mobile stations are now equipped (e.g., programmed) with a microbrowser application, which enables a user to engage in a scaled down version of the same sort of web browsing that is conventionally conducted from a desktop personal computer. In practice, the user typically interacts with the microbrowser through a display screen and keypad on the mobile station. The microbrowser exchanges instructions with a server to perform functions requested by the user, and it may also interpret instructions received by the server that describe the layout and content of the microbrowser screen or that request the microbrowser to query the user for information.

Typically, the microbrowser communicates with the server in accordance with a standard protocol, such as the Wireless Application Protocol (WAP) for instance. (In the usual arrangement, the server is a WAP server, which functions as an interface between conventional web servers and WAP-based clients, i.e., mobile stations. In this regard, the WAP server may receive a full HTML page from a conventional web server and translate the page into an abridged form suitable for presenting on the smaller display screens found on most WAP clients, and vice versa for data provided by the mobile WAP client.)

WAP generally employs a markup language, such as WML (wireless markup language), HDML (handheld device markup language) or iMode, for transferring content. These markup languages include a set of instructions for commanding a microbrowser to perform particular functions, such as displaying text, requesting user input, or sending data to the server for instance.

The markup language instructions are generally referred to as "tags." Markup languages typically use a "tag document" embodying a set of tags to describe the content of a screen. The microbrowser interprets the tag document and displays content on the screen of the mobile station or takes other actions accordingly.

In WML and HDML, a tag document that describes the layout of a single screen is typically referred to as a "card," and a tag document (or set of documents) that describes the layout of multiple screens is typically referred to as a "deck of cards." A user navigates in the microbrowser environment, i.e., the screens, by moving through one or more cards.

Microbrowsers commonly display three types of cards, which may be referred to generically as text-cards, entry-cards, and choice-cards. A text-card is a card that displays text (or, equivalently, other characters, images or media). An entry-card also typically displays text but additionally displays a text entry segment that allows the user to enter text. A choice-card displays a list of options selectable by the user. Conventionally, the list of options may be displayed in a menu format in which each option is accompanied by a corresponding number. Thus, the user is able to select an option by pressing its corresponding number key on the keypad or by scrolling to the option and engaging a designated key (e.g., a softkey) on the mobile station keypad or other user interface.

A choice-card may be programmed so that selection of particular options will cause the microbrowser to perform a corresponding function. For example, one option may take the form of a hyperlink, which, when selected by a user, causes the microbrowser to display another designated card from a deck or to send a navigation command to the server asking the server to send a new card (e.g., one associated with another web site). Another option may, when selected, cause the microbrowser to send other designated data to the server. Still other options may, when selected, cause the microbrowser and/or mobile station to take some other action. Other examples are possible as well.

Similarly, it is possible that a text-card or other sort of card may be programmed with selectable links that are designed to cause the microbrowser to take various actions when selected. For example, a text-card may be programmed to define a function that the microbrowser should take in response to user instruction (e.g., selection of a softkey or stylus-based selection of an item on a touch-sensitive screen for instance).

The ability to engage in data sessions at mobile stations has opened up a myriad of possibilities. Mobile station users can now access a wide variety of information services from almost anywhere where mobile communications are supported. The information services can take a variety of forms, including, for instance, stock quotes, sports scores, weather reports, traffic reports, and information about locations of facilities such as restaurants, hotels and gas stations.

Some of the information services that a user might access from a data-capable mobile station may be location-based. For instance, an information service might be arranged to provide weather or traffic conditions for a particular geographic location, or to provide the street addresses of a designated type of restaurant (e.g., all pizza restaurants) in particular geographic location.

Advantageously, such location-based services may be keyed to the location of the mobile station, so that a user of the mobile station can access the information service and obtain information about the user's present location. For instance, a web service provider might allow a user to query a data server for the addresses of all pizza restaurants located near the user's current location. As another example, a web service provider might allow a user to request traffic conditions on major roads near the user's current location. The data server might then send the requested location-based information to the microbrowser, and the microbrowser may cause the information to be displayed for viewing by the user.

Alternatively, the location-based service may involve having the data server take a location-based action even without providing location-based information to the mobile station for presentation to the user. For example, based on the fact that a mobile station is in a particular location, the data server might send a particular message to some other entity or take some other responsive action.

In order to facilitate such location-based services, however, a mechanism should be provided for conveying a user's current location to a data server.

SUMMARY

One method of providing a data server with a user's current location is to have the user expressly enter an indication of his or her current location. This can be done in several ways. For example, through use of a microbrowser, the user may navigate through, and interact with, one or more entry or choice cards so as to provide the user's street address or an indication of nearby landmarks such as airports for instance. The user may, for example, enter text into an entry card, or select an address through interaction with a series of choice cards.

This approach has a number of disadvantages, however. For one thing, the user may know only his or her general location, such as a state or city, which may not be specific enough to allow the server to provide useful location-specific information. Further, the text-entry facilities of most mobile stations often make it difficult for a user to enter text information such as a street address. (Techniques for doing so include the "triple tap" method, by which a user presses a numeric key on a conventional telephone touch pad a number of times to type a letter displayed on the numeric key; but such methods can be burdensome in practice.) Other ways of obtaining a user's location are available, but they typically require specific hardware or hardware modifications. For example, the wireless network could use triangularization techniques to locate the user's mobile station. However, employing triangularization may require substantial modification of existing networks and may place substantial added demands on network resources.

As another example, each base station in the network could be made to broadcast an indication of the base station's latitude and longitude (via a suitable beacon for instance). However, this too would require substantial modifications to some existing wireless networks. Further, many mobile stations would have to be modified or specially designed in order to be able to receive the latitude and longitude information and then pass the information to the microbrowser for transmission in turn to a data server.

As still another example, mobile stations may be provided with advanced positioning functionality, such as a location system that relies on Global Positioning System (GPS) signals. However, such positioning functionality typically adds cost and complexity to a mobile station. Therefore, it may be quite some time before most mobile stations have such functionality.

An exemplary embodiment of the present invention provides a technique for communicating a mobile station's location to a data server in a way that leverages existing technologies and can therefore be implemented relatively efficiently. In accordance with the exemplary embodiment, when a mobile station is engaged in a data session with a data server, the mobile station may be made to place a voice call to a designated "dummy" number. Through use of advanced intelligent network techniques, a call processing entity (such as an MSC, WAG or session manager, for instance) may then responsively send a signaling message to a central controller, thereby providing the controller with an indication of the mobile station's current location (e.g., cell and sector, or any other wireless coverage area defined by the network). In turn, the controller may then provide that location information to the data server or make the location information available for retrieval by the data server. Conveniently, the data server may then obtain the location information and carry out a service based on the location.

Thus, in one respect, an exemplary embodiment of the invention may take the form of a method of conveying a mobile station's location to a node that engages in a data session with the mobile station. The method may involve embedding a voice call within the data session, so as to cause the mobile station's location to be communicated to a call processing entity. The method may then involve communicating the location from the call processing entity to the node.

In another respect, an exemplary embodiment may take the form of a method for making a mobile station's location available to a server, where the server is engaged in a data session with said mobile station via an air interface, and where the mobile station is able to communicate with a telecommunications network (e.g., a switching system and central controller). The method may involve the telecommunications network receiving a call origination request from the mobile station, which may be a request to initiate a call to a particular number. In response to the call origination request, the telecommunications network may then determine (e.g., extract, cross-reference, or otherwise establish) a location of the mobile station. The telecommunications network may then make that location available to the server. Once the server obtains the mobile station's location, the server may conveniently use the location to perform a location-based service, possibly formulating one or more messages for the mobile station based on the location.

In this arrangement, the server itself might send to the mobile station a tag document or other set of instructions that indicates the number for the mobile station to call. The tag document, which may conventionally define at least one display segment that a browser application may present to a user, might include an autolocate tag. The autolocate tag, when executed, may cause the mobile station to dial the specified number. Further, the dialed number might be uniquely associated with the server (and other numbers might be uniquely associated with other such servers).

In still another respect, an exemplary embodiment of the invention may take the form of a system for communicating a mobile station's location to a node with which the mobile station engages in a data session (e.g., before and/or during the data session). The system may include (i) program instructions executable by the mobile station, and (ii) program instructions executable by a call processing entity (i.e., an entity that is involved with processing a call request).

The program instructions executable by the mobile station may include an autolocate tag and may be arranged to cause the mobile station to initiate a voice call during the data session. Upon initiation of the voice call, a message defining the location of the mobile station may be provided to the call processing entity. The program instructions executable by the call processing entity, in turn, may be arranged to cause the call processing entity to make the location of the mobile station available to the node.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 6 (two parts) is an illustration of screen displays that may be presented to a mobile station user in accordance with the exemplary embodiment.

DETAILED DESCRIPTION OF EXEMPLARY EMBODIMENT

1. Exemplary Architecture

Figure 1:
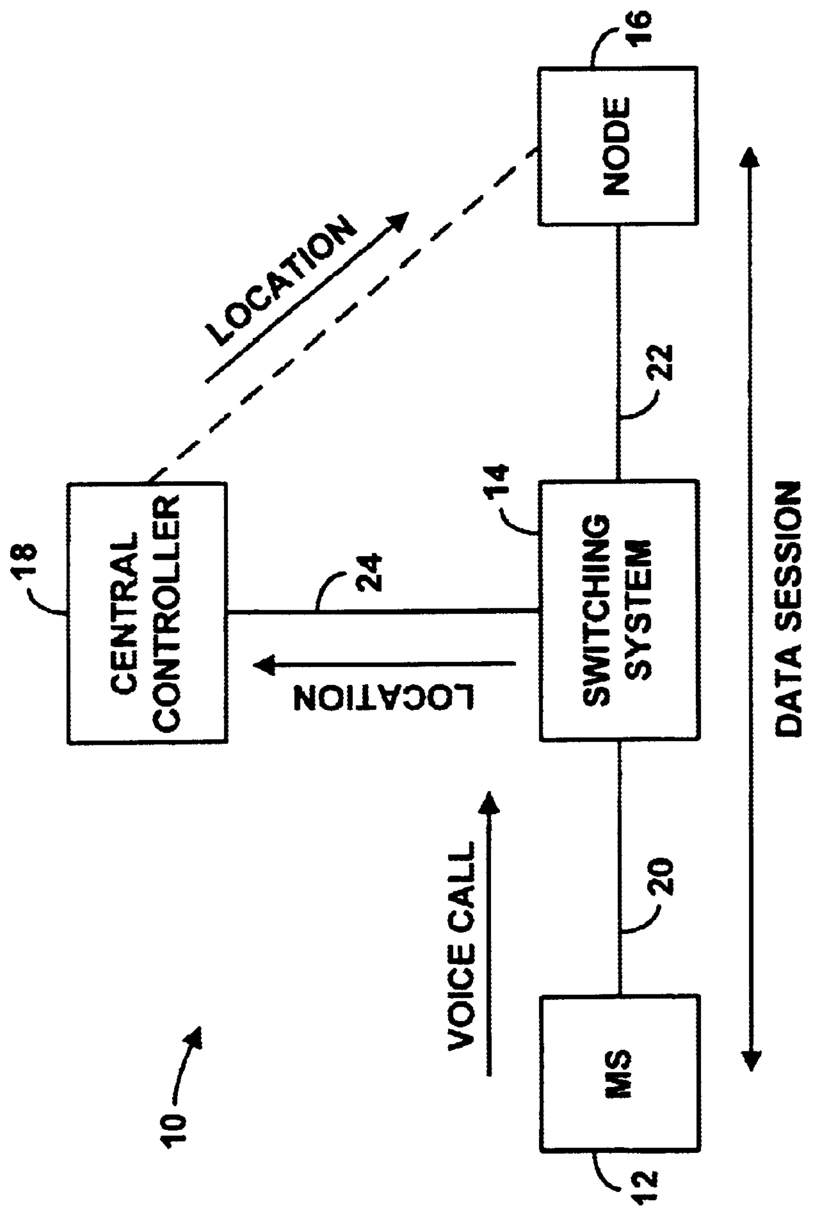
FIG. 1 is simplified block diagram depicting functional components of a system operating in accordance with the exemplary embodiment.

Referring to FIG. 1, there is shown a simplified block diagram depicting a system 10 in which an exemplary embodiment of the present invention can be employed. As shown in FIG. 1, system 10 includes an exemplary mobile station 12, a switching system 14, a remote node 16, and a central controller 18. Mobile station 12 is shown being communicatively coupled with switching system 14 by an interface 20, and node 16 is shown being communicatively coupled with switching system 14 by an interface 22. Additionally, switching system 14 is shown being communicatively coupled with central controller 18 via an interface 24. Finally, a communication interface 26 is shown between central controller 18 and node 16.

It should be understood that this and other arrangements described herein are illustrative only, and that other arrangements are possible as well. For instance, other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, in any suitable combination and location. Additionally, where an element is described as performing a function, it will be understood that the element could perform the function by executing of a set of machine language instructions (software instructions), and/or by applying suitable hardware or firmware.

Mobile station 12 may take any of a variety of forms. For instance, mobile station 12 could be a cellular telephone, a PDA, a pager, or a notebook computer. Preferably, mobile station 12 is equipped with a microbrowser application (such as UP.Browser version 3.04) or other such functionality, to be able to engage in a data session with another entity. Mobile station 12 may be a portable or fixed wireless device that communicates via a cellular radio frequency communications system, and interface 20 may be an air interface. An example of such a mobile station is the Sprint PCS Touchpoint Phone Model TP2100. Alternatively, however, mobile station 12 could be another sort of wireless device (e.g., arranged to communicate according to principles such as Bluetooth, for instance) or even a landline station (such as a mobile notebook computer that has been plugged into a landline port of a local area network). Other examples are possible as well.

Switching system 14 may also take various forms. For example, switching system 14 may comprise a radio access system such as described in the above background section. Such a system may facilitate communicatively coupling mobile station 12 with other nodes (e.g., via the PSTN, an intranet, or the Internet), such as node 16 for instance. As another example, switching system could be provide a direct link between mobile station 12 and node 16. In the exemplary embodiment, switching system 14 may be include program logic executable to cause switching system 14 to respond to a voice call initiated from mobile station 12. System 14 could also take other forms as well.

Node 16 may, similarly, take various forms. In the exemplary embodiment, node 16 may be a data server. As such, node 16 may be any computer programmed to function as a data server, and interface 22 may represent the Internet. In an exemplary arrangement, if mobile station 12 operates a microbrowser and functions as a WAP client, interface 22 may include a WAP server, so as to facilitate communication between node 16 and mobile station 12. Alternatively, mobile station 12 and node 16 may communicate directly in a client-server relationship or other relationship (e.g., peer-to-peer, for instance). Node 16 may also take other forms.

Central controller 18 may also take various forms. As examples, central controller 18 may be an SCP (e.g., an Integrated SCP (ISCP) such as that available from Telcordia Technologies, Inc.), a home location register (HLR) or a similar entity such as a feature server, for instance. As such, central controller may include program logic executable to respond to signaling messages provided from switching system, so as to perform supplemental call processing services. Other examples are possible as well.

Figure 2:
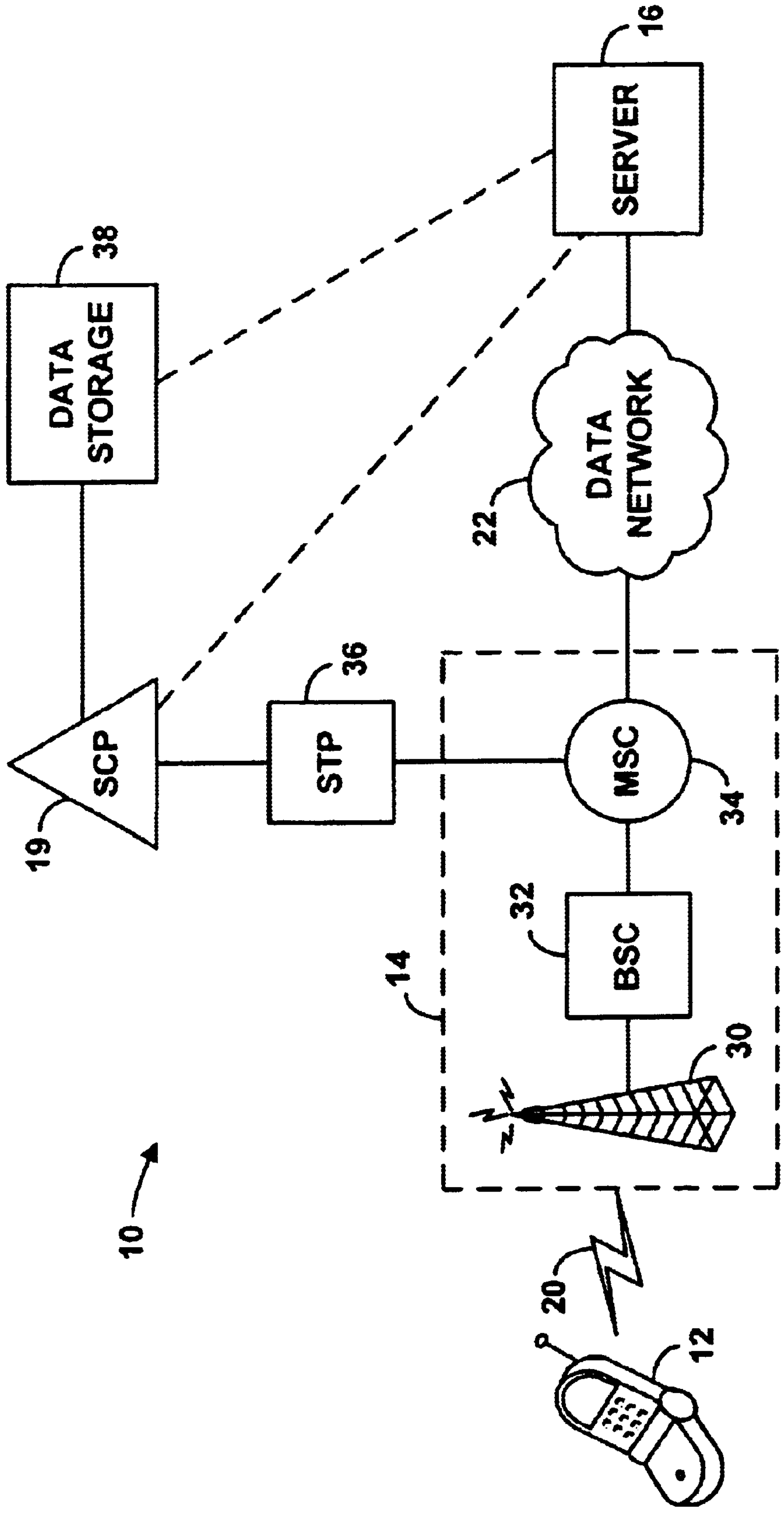
FIG. 2 is another simplified block diagram depicting functional components of a system operating in accordance with the exemplary embodiment.

To help illustrate further, FIG. 2 depicts an example of more detailed block diagram of system 10, using the same numbers as used in FIG. 1 for convenient reference. In this example, mobile station 12 is shown communicating over an air interface 20 with a BTS 30. BTS 30 is in turn coupled to a BSC 32, which is then coupled with an MSC 34. BTS 30, BSC 32 and MSC 34 may cooperatively define a radio access network 14.

MSC 34 is coupled with a data network 22 to which a server 16 is also coupled. Additionally, MSC 34 is coupled with a signaling network comprising an exemplary signal transfer point (STP) 36, and the signaling network is in turn coupled with an SCP 18. FIG. 2 also depicts a data storage system 38 (which may comprise a database, a memory or other storage medium). Data storage system 38 may be integrated with SCP 18 or may be located at some external location, such as at a predetermined IP address on data network 22 for instance.

Figure 3:
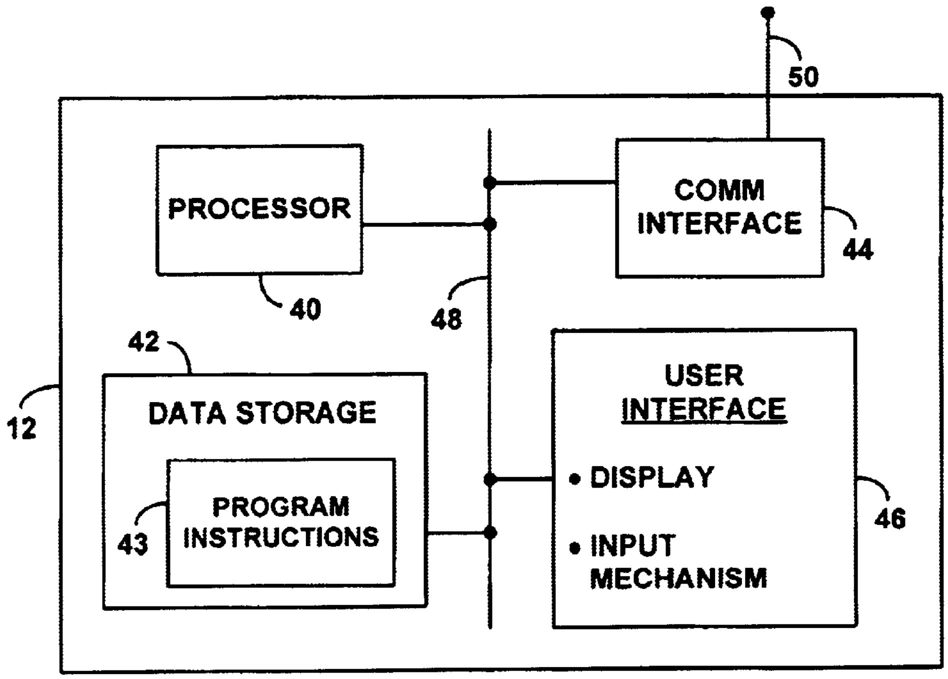
FIG. 3 is a functional block diagram of an exemplary mobile station operable in the exemplary embodiment.

Referring now to FIG. 3, a functional block diagram of an exemplary mobile station 12 is shown. As illustrated, mobile station 12 may include a processor 40, data storage 42, a communications interface 44, and a user interface 46, all of which may be coupled together via a system bus 48.

Data storage 42 may function to hold a set of machine language instructions defining program logic executable by processor 40 to carry out various functions described herein. An example of such program logic may be a microbrowser application. Further, data storage 42 may function to hold other data, such as HDML cards that mobile station 12 may receive from a data server for instance, and such as data input by a user.

Communications interface 44 may function to establish communications via air interface 20. As such, communications interface 44 may comprise software logic and/or may comprise a transceiver suitable for interfacing between processor 40 and a radio frequency antenna 50.

User interface 46 may comprise mechanisms for presenting information to a user and for receiving information from a user. In the exemplary embodiment, user interface preferably comprises a display screen (e.g., an LCD display) and an alphanumeric keypad of the type normally found on a telephone. However, other arrangements are possible as well.

Figure 4:
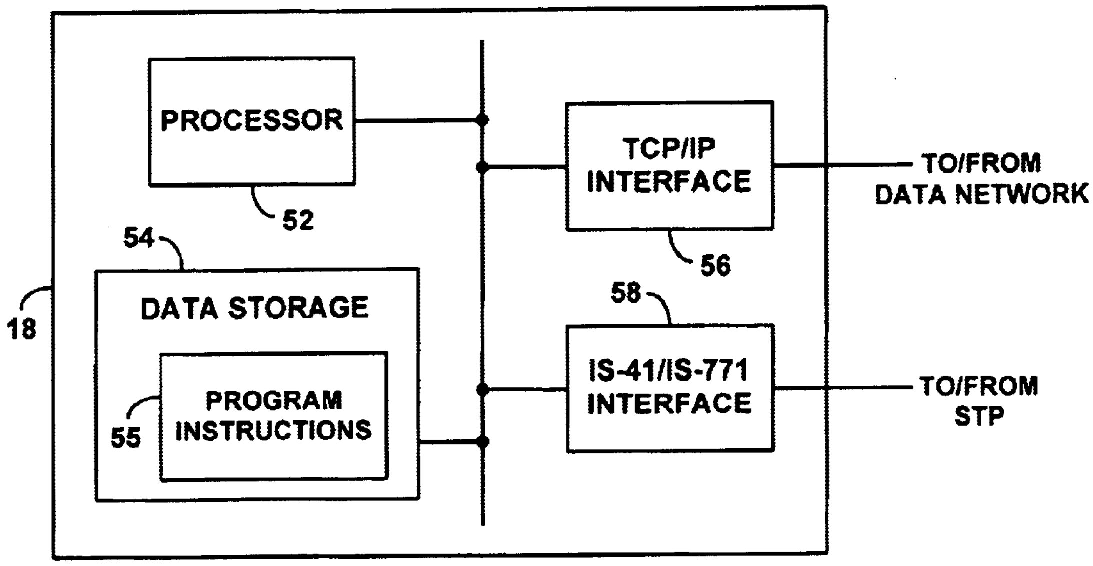
FIG. 4 is a functional block diagram of a central controller operable in the exemplary embodiment.

Referring next to FIG. 4, a functional block diagram of an exemplary central controller (e.g., SCP) 18 is shown. As illustrated, controller 18 may include a processor 52, data storage 54, a TCP/IP communication interface 56, and an IS-41/IS-771 communication interface 58.

Data storage 54 may house program logic executable by processor 52. The logic may be designed to respond to a signaling message sent from MSC 34 by extracting from the signaling message a location parameter (or parameters), and storing the location parameter and/or forwarding the location parameter to another entity (such as data storage system 38 or server 16, for instance). Preferably, the logic will cause processor 52 tie together the location parameter with an identifier of the mobile station, such as a mobile identification number (MIN) for instance. That way, controller 18 or another entity may learn the location of the mobile station by performing a query keyed to the identifier.

The TCP/IP interface is an example of an interface that may facilitate communication between the controller 18 and other entities such as the data storage device 38 and server 16.

The TCP/IP interface may be a software module executable by processor 52 or may take another form. It may be arranged, for instance, to packetize outgoing data into TCP/IP packets suitable for transmission over an IP network to another entity and to depacketize incoming TCP/IP packets so as to recover data from the IP network for receipt by the processor.

In turn, the IS-41/IS-771 interface is an example of an interface that may facilitate communication between the controller 18 and MSC 34. IS-41 and IS-771 are industry standards (promulgated by the Telecommunication Industry Association/Electronic Industries Alliance (TIA/EIA)) that define messages that can be passed between an MSC and an SCP during call processing, to facilitate various functions. One such message, applicable herein, is an "Origination Request" (OREQ) message, by which the MSC may pass dialed digits (e.g., a called telephone number) and a location parameter to the SCP. According to IS-41, the location parameter in an OREQ message may be a LocationAreaID parameter, which identifies the cell and sector where the originating mobile station is currently located. The IS-41/IS-771 interface may be a software module executable by processor 52 or may take other forms.

2. Exemplary Operation

As shown in the block diagram of FIG. 1, mobile station 12 may be engaged in a data session with node 16. This data session may be established in any of a variety of ways. As an example, a user of mobile station 12 may open a microbrowser application on the mobile station and, through conventional techniques, may navigate to a web site hosted by node 16. During the exemplary data session, node 16 may thus responsively transmit to mobile station 12, via switching system 14, one or more web pages (e.g., cards), which mobile station 12 (per its microbrowser application) may responsively present to a user. Further, the mobile station may send data, such as navigation commands or user-supplied or user-selected information (e.g., data that the user has entered in a entry-card, or data indicative of an item that the user has selected from a choice-card), to node 16.

Figure 5:
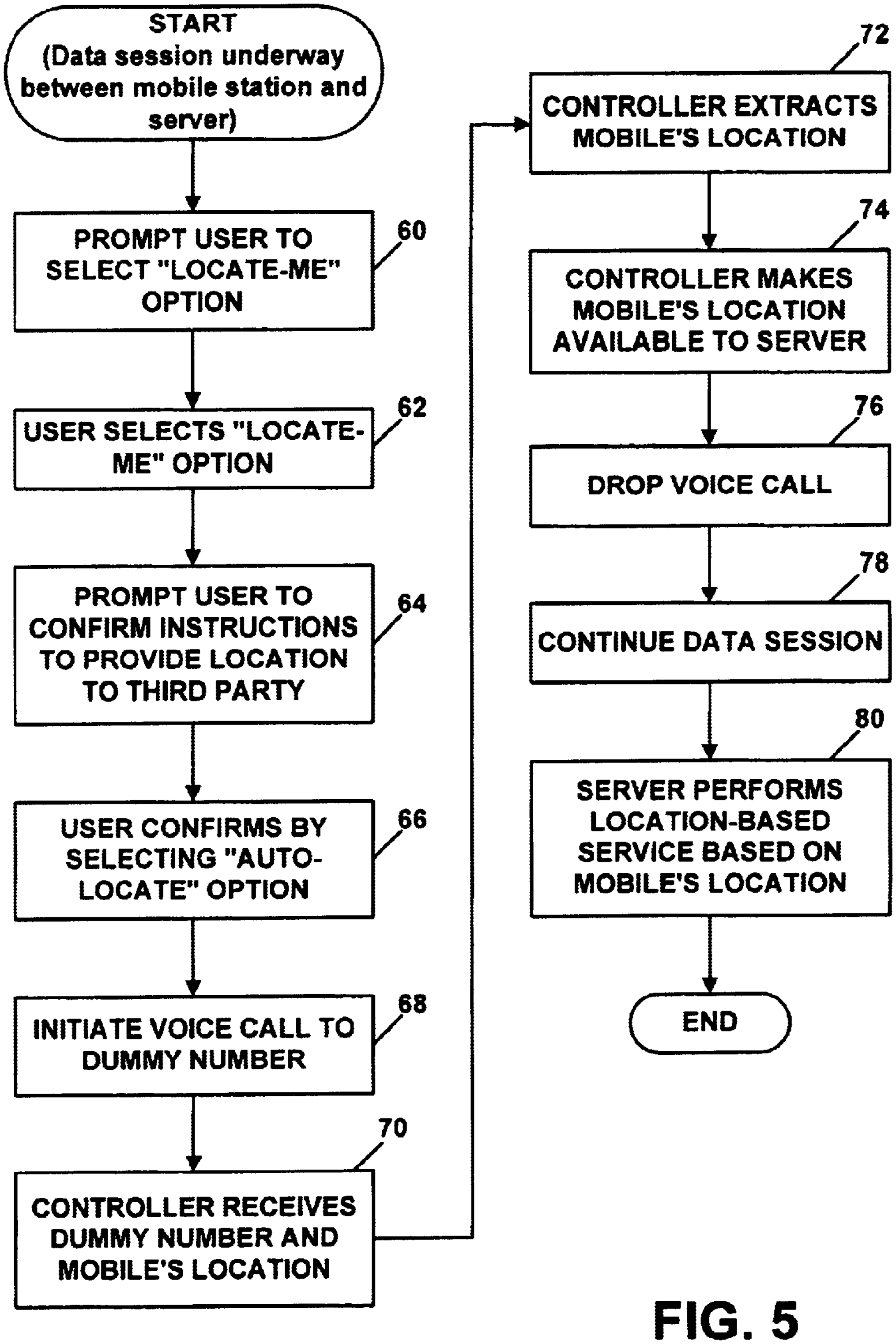
FIG. 5 is a flow chart depicting functions that may be performed in accordance with the exemplary embodiment.

Referring now to FIG. 5, there is shown a flow chart depicting a set of functions that may be performed by system 10 in accordance with the exemplary embodiment. In addition, FIG. 6 (parts A and B) depicts the content of exemplary HDML cards that node 16 may send to mobile station 12 for display to a user in accordance with the exemplary embodiment.

Assume, as a starting point, that the user of mobile station 12 has directed the microbrowser to navigate to a web site that provides a "Find a Restaurant" application, so that the microbrowser has sent a navigation command to node 16, and node 16 has responsively sent to the microbrowser a "Find a Restaurant" choice card. Such a choice card might give the user an option to request either a list of all restaurants or a list of all restaurants of a particular cuisine. Assume next that the user opts for a list of all restaurants by selecting option "1" on the choice card, so that the microbrowser sends selection number "1" to node 16.

Turning to FIG. 5 at step 60, node 16 may responsively send to the microbrowser a "Start Point" choice-card, which may define a number of options selectable by the user to indicate the geographic location in or by which the user is interested in finding restaurants. The microbrowser may then display that card, which may appear on the mobile station display as shown in FIG. 6A for instance. In the exemplary embodiment, one of the options on the "Start Point" choice card may be a "Locate Me" option, shown as option number "6" in FIG. 6A. At step 62, the user may select the "Locate Me" option in order to request that the user's current location be provided to node 16, so as to enable node 16 to find restaurants based on the user's current location.

For privacy and security purposes, the microbrowser may next prompt the user to confirm that the user wants to provide an indication of the user's current location to node 16. Thus, the "Start Point" card may be encoded to cause the microbrowser to respond to selection of the “Locate Me” option by sending selection number “6” to node 16. In response, at step 64, node 16 may send to the microbrowser a confirmation choice-card that allows the user to confirm the user’s instructions to provide location information to a third party, and the microbrowser may display the confirmation choice-card, which may appear as shown in FIG. 6B. (Alternatively, node 16 might have sent to mobile station 12 a deck of cards including those shown in FIGS. 6A and 6B, and the first might be programmed to cause the microbrowser to display the second card in response to the user’s selection of the “Locate Me” option.) As illustrated, the confirmation choice-card may have a title block that reads (by way of example) “You have asked your PCS service provider to pass your location to a third party. Press 1 to begin or press 3 to return to the previous screen. Press 2 to continue when this screen returns.” In turn, the options on the confirmation choice-card may include the following items (by way of example):

1. Auto-locate
2. Press to Continue
3. Go Back

In the exemplary embodiment, the confirmation card may be encoded to associate with the “Auto-locate” option an “autolocate” tag which may, for instance, be structured as the terms “<DIAL>” and “<dial>surrounding an accompanying telephone number. Alternatively, the tag may take the form of a “Call Number” tag, such as

<CE TASK=CALL NUMBER=1234567890>

Using this alternative syntax, the confirmation choice card might be encoded as follows:

```
<HDML version=3.0 markable=TRUE TTL=0>
  <CHOICE>
    You have asked your PCS service provider to pass
      your location to a third party. Press 1 to begin or
      press 3 to return to the previous screen. Press 2 to
      continue when this screen returns.
    <CE TASK=CALL NUMBER=1234567890>1.
      Auto-locate
    <CE TASK=GO DEST=next_page.hdml>2. Press
      to Continue
    <CE TASK=GO DEST=previous_page.hdml>3. Go
      Back
  </CHOICE>
</HDML>
```

At step 66 in FIG. 5, the user may then press the appropriate button, buttons or softkey(s) on the keypad, or take another designated action, to choose the “Auto-Locate” option. In response, the microbrowser may execute the “autolocate” tag.

According to the exemplary embodiment, the microbrowser may be programmed to execute the “autolocate” tag by initiating a voice call to the telephone number associated with the tag. In the exemplary embodiment, the telephone number may be a “dummy” number, in that it does not correspond to the directory number of any actual telephone or other device. (Alternatively, the telephone number could correspond to a particular device or subscriber.) The telephone number might, however, be uniquely associated with node 16 (which can be conveniently accomplished, because node 16 may encode its own dummy number on the card that it provides to the mobile station), and other dummy telephone numbers might be uniquely associated with other nodes.

For example, the number associated with the autolocate tag may be (123) 456-7890, so that item “1” on the confirmation card may be linked to the tag “<DIAL>1234567890<dial>” (or “<CE TASK=CALL NUMBER=1234567890>”) for instance. Consequently, at step 68 in FIG. 5, the microbrowser could execute the “autolocate” tag by causing the mobile station to initiate a call to the dummy number (123) 456-7890. In particular, the mobile station may automatically dial and send to MSC 34 the digits 1234567890.

The autolocate tag may be associated with other numbers as well. For instance, instead of associating the tag with a conventional directory number, the tag may be associated with a predetermined feature code, such as an asterisk followed by several digits. An example of such a feature code might be *562. Thus, item “1” on the confirmation card might be linked to the tag “<DIAL>*562<dial>” (or “<CE TASK=CALL NUMBER=*562>”).

As with the directory number described above, this feature code might be uniquely associated with node 16, and other feature codes might be uniquely associated with other nodes. Further, the autolocate tag might be associated with a feature code followed by a particular code number that is uniquely associated with node 16.

As still another example, the autolocate tag may be directly associated with a network address (such as an IP address and port) of node 16 and a predetermined port number at node 16.

In this regard, an IP network address is typically comprised of four subparts, each of which may be up to three digits long. An example of such an address is 10.12.2.228. If any subpart that is fewer than three digits long is padded with zeros, the IP address may be forced to be 12 digits long, such as 010.012.002.228. Given a predetermined port number of 80 at node 16, for instance, the item “1” on the confirmation card might be linked with the tag “<DIAL>01001200222880<dial>” (or “<CE TASK=CALL NUMBER=01001200222880>”) for instance.

Further, as suggested above, such a network address can be additionally tied together with a predetermined feature code, such as *562 for instance.

In response to those dialed digits, the MSC may begin to process the call request. In doing so, the MSC may recognize a trigger that indicates special handling of the call is required. Beneficially, such triggers are already provided for in standards such as IS-41 and IS-771 and are implemented in many wireless networks. A specific trigger that could be used is the “all digits” trigger, in which the MSC recognizes a trigger no matter what telephone number the mobile station has dialed. Alternatively, the trigger could be a number-based trigger, in which the MSC would recognize a trigger of this type only when the mobile station dials specific digits (or type of digits). Other examples are possible as well.

In response to the trigger, the MSC may launch a query or other signaling message to central controller 18 to request call handling instructions. As noted above, the signaling message may conventionally be an OREQ message, one of the parameters of which may be the LocationAreaID parameter that identifies the originating station’s current cell and sector. Another parameter of the OREQ message may define the dialed digits, such as 1234567890 for instance. Still another parameter of the OREQ message may be a mobile station ID number, such as a mobile identification number (MIN) for instance. Thus, at step 70 in FIG. 5, the controller may receive the dummy number 1234567890 and the LocationAreaID parameter indicative of the mobile station’s current location.

In accordance with the exemplary embodiment, controller 18 may be programmed to respond to an OREQ message that contains the dummy number 1234567890 by executing a predetermined set of logic that causes the controller to extract the LocationAreaID parameter from the OREQ message, as shown at step 72 in FIG. 5. Further, the logic may cause the controller to convert the cell and sector information defined by the LocationAreaID parameter into geographic information, such as by causing the controller to consult a stored table that correlates geographic mid-points of sectors with associated latitude and longitude coordinates.

Alternatively, the controller may obtain the mobile station's location in another manner. For example, the controller may query a mobile positioning center (MPC), or an HLR or other entity that may already know the mobile station's current location, and that other entity may provide the controller with an indication of the mobile station's location.

At step 74 in FIG. 5, controller 18 may then make the mobile station's location (e.g., as latitude/longitude information, or in any other desired form) available for use by node 16. This function may take various forms. As an example, the controller may itself store an indication of the mobile station's location, together with a mobile station ID, in an internal or external storage medium (e.g., data storage system 38 as shown in FIG. 2). The storage medium or an entity that controls the storage medium may be located at a network address that is known by node 16 (e.g., at some predetermined IP address). Thus, node 16 could retrieve the mobile station's location from that network address (e.g., via FTP, HTTP or another mechanism), through an appropriate query keyed to the mobile station ID for instance.

In an exemplary arrangement, however, controller 18 might be a mission-critical call processing node (such as an SCP or service agent, for instance). Consequently, it may be better to have controller 18 offload the location data to another entity from which node 16 can retrieve the location, rather than to have node 16 communicate directly with controller 18 (which could affect call-processing performance). By way of example, an Internet Service Gateway can be situated functionally between controller 18 and node 16 and may function as a client to the controller and a proxy for node 16. Node 16 may signal to the Internet Service Gateway to obtain location information, and the Internet Service Gateway may responsively query controller 18 (e.g,. via a CORBA or other interface), to obtain the requested data for node 16. In this arrangement, the Internet Service Gateway can also advantageously manipulate the data provided by controller 18, so to provide a data format desired or expected by node 16.

In order for node 16 to retrieve the mobile station's location in this way (from controller 18 or from the intermediate entity or another entity), node 16 may need to know the mobile station ID. In view of privacy concerns, however, most existing web-enabled mobile stations are programmed to not provide their MIN to data servers. Instead, during (or at the initiation of) a data session, the data server may obtain an encrypted MIN, generated through a predetermined encryption algorithm. To retain this privacy, controller 18 may be programmed to encrypt the mobile station's MIN using that predetermined algorithm and to store the mobile station's location together with the encrypted MIN. Node 16 may then conveniently retrieve the location through a query keyed to that encrypted MIN.

As another example, rather than having controller retrieve the mobile station's location, controller 18 (or another entity) may transmit an indication of the mobile station's location to node 16 (by FTP, HTTP or another mechanism). In order to do so, either controller 18 or an intermediate entity (in a communication path between controller 18 and node 16) may need to know the network location of node 16. To facilitate providing the controller with this knowledge, node 16 may be uniquely associated with the dummy number dialed by mobile station 12 as noted above, and controller 18 (or an intermediate entity) may programmatically refer to a table that correlates dialed numbers with respective network addresses.

Thus, in the embodiment described above where the dialed number 1234567890 is uniquely associated with node 16, for instance, controller 18 may determine by reference to a suitable table that that number corresponds with a particular IP address, which is the address of node 16. Controller 18 may then send the mobile station's location to that address. Similarly, in the embodiment described above where the dialed number comprises the feature code *562, the controller may equally determine by reference to a table that the number corresponds with the IP address of node 16 and then send the location to that address. Of course, in the embodiment where the dummy number itself comprises the IP address of node 16 and a predetermined port, the controller may be programmed to extract the IP address and port, parse the sub-parts of the address, and thereby uncover the IP address of node 16. Other examples are possible as well.

Still alternatively, mobile station 12 may itself retrieve the indication of its own location from a network address where controller 18 has caused the location information to be stored (or the controller may transmit the location information to the mobile station). The mobile station may then programmatically transmit the location information to node 16. Further, the mobile station may conveniently display the location information for viewing by the user.

At step 76 (which may alternatively precede steps 72 and 74, as one of many possible variations), controller 18 may then send a response message to MSC 34, instructing the MSC to drop the call. In turn, MSC 34 may then drop the call. Alternatively, controller 18 may send a response message to MSC 34, directing MSC 34 to play an informational announcement to the user indicating that the voice call is completed and that the user can resume the data session. In turn, the user may press a designated button (e.g., a “CLR” or “END” button) to drop the call.

In the exemplary embodiment, processor 40 of mobile station 12 may be programmed to return to a data session that was in progress when an embedded voice call was initiated. (A Touchpoint Phone Model TP2100 with UP.Browser version 3.04, for instance, may be made to perform such a function.) For instance, when executing an auto-locate tag, the microbrowser may cause the processor to cache the card that is currently displayed before the microbrowser instructs the mobile station to dial the designated number. Upon completion of the call (e.g., when the MSC drops the call and the mobile station therefore goes back “on hook”), the processor may then automatically return to the display the cached card.

Thus, as shown at step 78 in FIG. 5, after MSC 34 drops the call, mobile station 12 may return to display the confirmation card as shown in FIG. 6B, so as to continue the data session.

From the user's perspective, it may appear as though nothing happened when the user selected option “1” on that card. Alternatively, depending on the arrangement of the mobile station and microbrowser, after the user selects option “1,” the user may see the phone display the dummy number being dialed, followed quickly by the end of the call to that dummy number.

Conveniently, the exemplary card shown in FIG. 6B may then instruct the user to select option “2” to continue. When the user selects that option, the microbrowser may responsively send selection number "2" to node 16. In response to that selection number, node 16 may retrieve the mobile station's current location in the manner indicated above if the node has not already obtained the mobile station's location.

In turn, the node may perform a location-based service based on the mobile station's location. In the present example, for instance, node 16 may consult a table that correlates restaurants with geographic locations and may thereby obtain a list of all restaurants within a predetermined geographic distance of the mobile station's location. The node may then construct a text card that lists those restaurants and transmit that card to the microbrowser for display to the user.

3. Conclusion

An exemplary embodiment of the present invention has been described above. Advantageously, the exemplary embodiment may allow location information that is generated when a mobile station uses a wireless network to be passed to a server engaged in a data call with that mobile station. Conveniently, the exemplary embodiment may do so through use of functional entities (e.g., an MSC and SCP) and messaging schemes (e.g., an OREQ message) that are already in place in many wireless telecommunications networks, thereby reducing the need to make substantial network modifications.

Those skilled in the art will understand, however, that changes and modifications may be made to the embodiment described above without departing from the true scope and spirit of the present invention, which is defined by the claims.

We claim:

1. A method comprising:

receiving into a mobile station at least one tag document provided by a data server, the tag document defining an autolocate tag, the autolocate tag defining a number;

the mobile station receiving user input;

in response to the user input, the mobile station executing the autolocate tag and thereby initiating a voice call to the number, whereby a telecommunications network processes the voice call and responsively makes a location of the mobile station available to the data server, and whereby the data server obtains the location and performs a service based on the location so as to establish location-based information;

the mobile station receiving the location-based information from the server; and the mobile station presenting the location-based information to a user.

2. The method of claim 1, wherein the number comprises a dummy number.

3. The method of claim 1, wherein at least a portion of the number is uniquely associated with the server.

4. A system for communicating a mobile station's location to a node with which the mobile station engages in a data session, the system comprising:

a first processor at the mobile station;

first data storage at the mobile station;

a communications interface at the mobile station;

program instructions stored in the first data storage and executable by the first processor to cause the mobile station to initiate a voice call via the communications interface during the data session, wherein, upon initiation of the voice call, a message is provided to a call processing entity, the message defining a location of the mobile station;

a second processor at the call processing entity;

second data storage at the call processing entity; and program instructions stored in the second data storage and executable by the second processor, in response to the message, to cause the call processing entity to make the location of the mobile station available to the node.

5. The system of claim 4, wherein:

the program instructions executable by the mobile station comprise an autolocate tag defining a number; and the voice call is a call to the number.

6. The system of claim 5, wherein the number is uniquely associated with the node.

7. The system of claim 5, wherein the number is a dummy number.

8. The system of claim 5, wherein the autolocate tag is encoded in a tag document that the node provides to the mobile station.

9. The system of claim 4, wherein the program instructions executable by the second processor cause the call processing entity to store an indication of the location at a predetermined address accessible by the node.

10. The system of claim 4, wherein the program instructions executable by the second processor cause the call processing entity to transmit an indication of the location to the node.

* * * * *